Nov. 16, 1943. S. MYERSON 2,334,214
CARDING DEVICE FOR ARTIFICIAL TEETH
Filed Aug. 19, 1941

Inventor
Simon Myerson
by Roberts Cushman & Woodberry
Att'ys.

Patented Nov. 16, 1943

2,334,214

UNITED STATES PATENT OFFICE 2,334,214

CARDING DEVICE FOR ARTIFICIAL TEETH

Simon Myerson, Brookline, Mass.

Application August 19, 1941, Serial No. 407,455

11 Claims. (Cl. 32—71)

This invention pertains to mounting devices for artificial teeth and relates more particularly to an improved tooth mount so constructed that the teeth mounted thereon may be shipped by the manufacturer to the dentist or dental laboratory as a matched set so relatively arranged as to be displayed advantageously in simulation of a natural arrangement of teeth in the mouth and properly supported for shipment and for use by the dentist as a trial set without removing the teeth from the arched mount on which they are shipped, thereby to permit the dentist and patient to observe the effect in the patient's mouth of the very teeth which it is proposed subsequently to install permanently in a denture.

It has been the common practice for the manufacturer of artificial teeth to mount a matched set upon a substantially flat card or similar support for shipment to the dentist or dental laboratory. After receiving the teeth so mounted, it was necessary for the dentist to remove them from the card and set them up on a trial plate in order to determine their fitness of appearance and size, or their suitability as to form or color when actually placed in the mouth.

In accordance with the present invention the teeth are removably attached to a curved or arched mount or support whereon, when viewed from the front, they closely simulate the appearance of natural teeth in the gum, the arched mount having provision for attaching it alternatively to a shipping device or display base or to an intra-oral support, for example, an impression tray or part-tray.

Among the objects of this invention are to provide a simple, easily constructed tooth mount which is light in weight; so small and inconspicuous as substantially to be concealed by the teeth mounted upon it; which may be made at a low cost; and which is provided with a curved or arched tooth-supporting part having means for detachably securing the teeth thereto; to provide a tooth mount whose supporting portion is of such shape that it may be readily positioned within the mouth of the patient so as to permit observation of the effect of the teeth substantially as they will appear when in actual use; to provide a tooth mount having provision whereby it may be removably secured to a substantially rigid shipping device or display base for convenience in shipping from the manufacturer to the dentist or dental laboratory and for suitably holding the teeth for display purposes; and to provide a tooth mount having provision for removably securing it to a part-tray, an impression tray or other intra-oral support whereby the mount may be temporarily held in the patient's mouth in proper position to exhibit the teeth.

Other objects and advantages of the invention will be pointed out herein in a more detailed description by reference to the accompanying drawing, wherein Fig. 1 is a front elevation of the improved tooth mounting device of the present invention;

Figure 1:
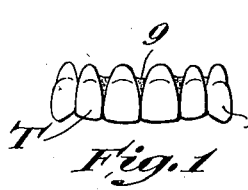
Figure 2:
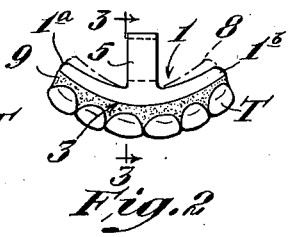
Fig. 2 is a plan view of the device shown in Fig. 1.
Figure 3:
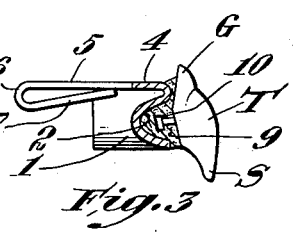
Fig. 3 is a section to a larger scale on line 3—3 of Fig. 2.
Figure 4:
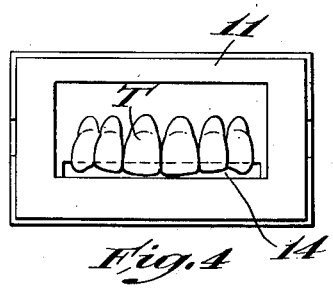
Fig. 4 is a top view of the tooth mounting device mounted on a base for shipment or display.

Referring to Figs. 1 to 5 of the drawing, the numeral 1 indicates the improved tooth mount. This mount, as illustrated, is made of sheet material and comprises an elongate narrow body portion which is channel-shape in transverse section so as to provide a groove 2 in its front or labial face. The mount may be of any appropriate normally substantially rigid material, for example metal or a moulded plastic such as vulcanite or one of the synthetic resins. This elongate channeled body is curved or bent between its ends 1ª and 1ᵇ (Fig. 2) so that its forward or labial channeled surface 3 is convexly arched, more or less to simulate the curvature of the human gum ridge. As illustrated in Fig. 3, this channeled body portion is provided with a horizontal top flange 4, which preferably extends from end to end of the strip in order to stiffen it, and from the central part of this flange an integral tab 5 projects rearwardly. As illustrated in Fig. 3, this tab 5 is folded or doubled upon itself at 6 to form an open loop and its free end portion 7 underlies the main part of the tab, the bend at 6 providing for slight resiliency of the loop.

The material from which the strip is made is preferably quite stiff and normally shape-retaining but, if desired, it may be sufficiently pliable so that if enough force be applied, the curvature or arch of the strip may be varied slightly, as indicated at 8 (Fig. 2), to permit the dentist to conform it to the gum ridge of the particular patient with which it is to be used.

The channel 2 of this arched strip is designed to receive a body 9 of a material which is plastic or which may be made to become plastic, for example, by the application of heat; material suitable for the purpose is the dental wax commonly employed by dentists for making impressions and the like.

Figures 11, 12:
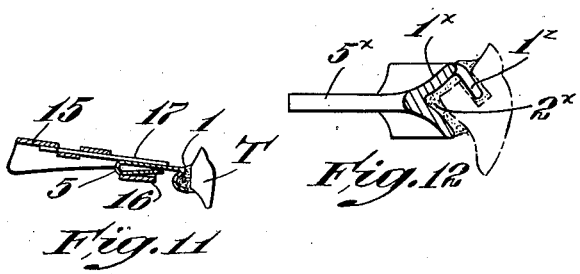
Fig. 11 is a section on line 11—11 of Fig. 10.
Fig. 12 is a section, generally similar to Fig. 9, illustrating an arched mount particularly designed for use with crown-type teeth.

The channeled strip is so narrow from top to bottom, as illustrated in Figs. 3 and 11, that when the attaching pins 10 of teeth T are operatively disposed within the body 9 of wax, the gingival portion G of the tooth overhangs the upper edge of the strip and the incisal portion S overhangs the lower edge of the strip. Thus if the device be employed as a trial plate for observing the effect of the teeth in the patient's mouth, it may be so disposed within the mouth that the lower surface of the gum ridge engages the upper surface of the flange 4 and the gingival faces of the teeth are disposed in direct contact with the front surface of the gum ridge. With this arrangement the teeth may be arranged in the patient's mouth in substantially the position which they will occupy when permanently installed in a plate—the strip or mount being so narrow vertically that it does not interfere with the proper positioning of the teeth nor prevent them from actually contacting the gum ridge. Moreover, the strip being so small and narrow, is quite inconspicuous and when supplied with a full complement of teeth, is scarcely visible from the front. Preferably, in placing the body 9 of wax in the channel 2, the wax is caused to overlie the exposed forward edges of the channeled strip so as completely to screen the body of the mount and thus only the wax is visible through the crevices between adjacent teeth. This arrangement of the wax has the further advantage that the teeth are firmly held in place not only by the pins embedded in the wax, but by the adhesion of the rear surface of the tooth to the extended body of wax covering the front edges of the channel member.

Fig. 12 illustrates a modified form of mount particularly designed for use with crown-type teeth. This modified mount comprises the vertically narrow, elongate arched body portion $1^x$ having the attaching tab $5^x$, the body portion having a wax-receiving channel $2^x$ in its convexly curved labial surface. However, in this arrangement the body portion is provided with a series of downwardly and forwardly directed pins $1^z$ which overhang and collectively define the upper boundary of the channel $2^x$ and which are designed to enter the cavities usually provided in the gingival surfaces of crown-type teeth. Dental wax or other appropriate adhesive is placed in the channel $2^x$ and also in the cavities of the teeth and then the teeth are so disposed, as indicated in dotted lines in Fig. 12, that one of the pins $1^z$ enters the cavity of each tooth, the wax engaging the pins and the upper, rear parts of the teeth so as removably to hold the latter in place.

Figure 5:
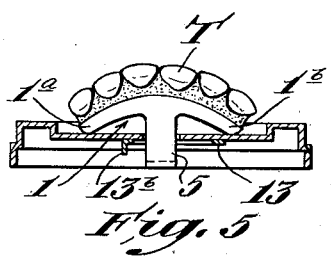
Fig. 5 is a view of the tooth mounting device mounted upon the base, the base being shown in longitudinal section.

When this device is to be used for shipping teeth from the manufacturer to the dental laboratory or to the dentist, it may be mounted upon a shipping and display base such as is illustrated by way of example in Figs. 4 to 7 inclusive. As illustrated, this base is of more or less rectangular contour and may be made of any suitable material, for instance, metal, vulcanite, or one of the synthetic resins. As shown, this base or support has an upper surface 11 which is furnished with a central depressed area having a downwardly and forwardly inclined floor $11^a$—the base preferably being hollow to make it lighter and to reduce cost and also to facilitate the attachment of the mount thereto. As illustrated, the inclined member $11^a$ is furnished with a slot 12 through which the tab 5 of the mount may be projected, as shown in Fig. 5. When so disposed, the ends $1^a$ and $1^b$ of the curved body portion of the mount contact the upper surface of the part $11^a$ of the base, the end of the tab projecting through slot 12 into the space beneath the part $11^a$.

Figure 6:
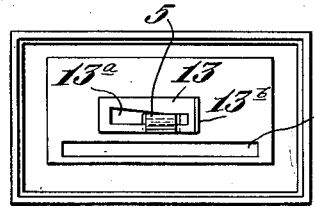
Fig. 6 is a bottom view of the base.
Figure 7:
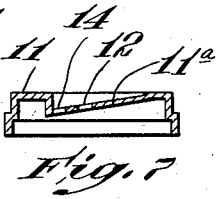
Fig. 7 is a transverse section of the base, the tooth mounting device being omitted.

For securing the mount in position, a thin cam-plate 13 is provided, such plate having a cam slot $13^a$ (Fig. 6) which is wide at one end and narrow at the other. This cam-plate is first disposed as shown in Fig. 5 so that the tab 5 may project through the wide part of the slot $13^a$ and then the cam-plate is slid lengthwise until the tab is engaged by the narrow part of the slot (Fig. 6). The plate 13 is of thin material and the edges defining the slot $13^a$ tend to bite into the material of the tab when the latter occupies the narrow part of the slot, thus securely retaining the card in position. For manipulating the cam-plate 13, the latter may be provided with a downwardly directed flange $13^b$, if desired. After securing the mount on the base in this way, it may be placed in a suitable box or receptacle for shipment without danger that the teeth will come into contact with any part which will displace them or which will injure them or the holder. After removal from the box or container, they are supported by the base in a convenient position for display. When it is desired to use the mount as a trial plate for observation in the mouth, it is readily removed from the base after disengaging the slide 13 from the tab 5.

Figures 8, 9:
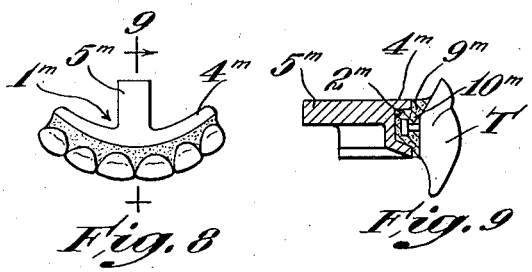
Fig. 8 is a plan view of a tooth mounting device of modified form.
Fig. 9 is a section on line 9—9 of Fig. 8.

In Figs. 8 and 9 the mount is specifically illustrated as made of moulded material, for example a synthetic resin. This mount $1^m$ has an elongate, forwardly arched portion provided with the channel $2^m$ and with the top flange $4^m$ from which projects the attaching tab $5^m$. The channel $2^m$ receives a body $9^m$ of wax which preferably covers the forward edges of the channeled member and which receives the attaching pins $10^m$ of the tooth T. The vertical width of the arched channel member is less than the length of a tooth so that when a tooth is mounted in proper position on the mount, it projects or overhangs both the upper and lower edges of the mount. This moulded mount may be attached to a base such as shown in Figs. 4 to 7 inclusive in the manner above described.

If the teeth T are of the improved type disclosed for example in the patent to Myerson No. 2,202,713, dated May 28, 1940, wherein the incisal portions of the teeth are so devised as to produce a dark shadowy effect when the tooth is viewed against a dark background, then it may be desirable to provide the base of Figs. 4 to 7 with an elongate slot 14 in the floor member 11ª so that when the teeth are arranged on the mount and the card is secured to the base, the transparent incisal portions of the teeth will overhang the slot 14. Thus their characteristics may be observed against the darkness of the space beneath the member 11ª of the base (providing the latter rest upon a solid support) or, if desired, against a bright or light background by holding the base so that the light from such background will shine through the slot 14.

Figure 10:
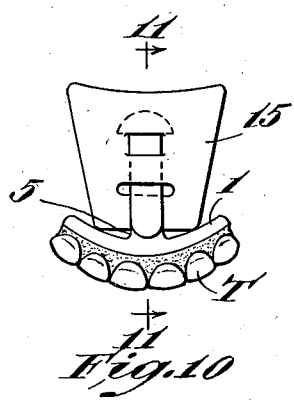
Fig. 10 is a plan view of the improved mounting device arranged on a part-tray for use as a trial plate.

In Figs. 10 and 11 there is illustrated an intraoral support in the form of a part-tray of such dimensions as to permit its introduction into the human mouth, said support being useful for holding the mount temporarily in position in a patient's mouth for observation. This part-tray 15 is shown as of sheet metal, although it may be of other material such as synthetic resin, and in contour and transverse section may approximate that of the central part of an upper plate. This part-tray is provided with a downwardly directed loop portion 16 (Fig. 11) which cooperates with a resilient tongue member 17 to form a friction socket for the tab 5 of the mount 1. As illustrated in Fig. 11, the tab 5 has been pushed rearwardly between the tongue 17 and the bottom wall of the loop 16, thus frictionally but removably attaching the mount to the part-tray.

The upper surface of the part-tray may now be furnished with a body of dental wax or the like, which may be made soft and plastic by warming it, the wax then being pressed upwardly against the roof of the patient's mouth and serving temporarily to secure the tray thereto so that the teeth may be observed in proper position with their gingival portions juxtaposed as closely as may be desired to the surface of the gum ridge and with the patient's lips in normal position. With this arrangement it is unnecessary for the dentist to hold the mount in position in the mouth by means of a holder or other device such as necessarily distorts the lips and prevents the patient and dentist from obtaining a proper, natural and unobstructed view of the mouth with the teeth placed therein. Since the teeth are removable from the mount, or may be twisted and adjusted to any desired relative positions, it is possible for the dentist to obtain the very best possible effect by experiment until both patient and dentist are satisfied with the results. The teeth as thus arranged on the mount may now be permanently installed in the denture, thus assuring the same permanent effect as is obtained during the trial as above described.

While certain desirable embodiments of the invention are herein illustrated by way of example, it is to be understood that the invention is not necessarily limited to these precise constructions but is to be regarded as broadly inclusive of any and all modifications thereof which fall within the terms of the appended claims.

I claim:

1. In combination, a normally substantially rigid tooth-holding mount having means for removably attaching teeth thereto, an impression tray, and attaching means operative removably to unite the mount and tray.

2. In combination, a normally substantially rigid tooth-holding mount including means for adjustably attaching teeth thereto, and an impression tray, the mount and tray having coacting elements operative to unite them, thereby to constitute a trial plate.

3. In combination, a tooth-holding mount including means for adjustably attaching teeth thereto, and an intra-oral support in the form of a part-tray which in contour and transverse section approximates the shape of the central part of an upper denture plate, the mount having a part projecting from its lingual side designed for engagement with said oral support, whereby the mount and support may be separably united to constitute a trial plate.

4. In combination, a normally substantially rigid tooth-holding mount having a body portion arched to simulate the curvature of the human gum ridge and having means operative adjustably to attach teeth to its convex labial face, a part impression tray of substantially rigid material which in contour and transverse section approximates the shape of the central part of an upper denture plate, and attaching means operative removably to unite the mount and tray.

5. In combination, a tooth-holding mount having an elongate, normally substantially rigid body portion arched in simulation of the curvature of the human gum ridge and having means for adjustably attaching teeth to its labial face, the body portion of the mount being of such vertical width that the gingival and incisal portions of teeth attached to said mount overhang the opposite edges of the mount, an intra-oral support in the form of a part impression tray which in contour and transverse section approximates the shape of the central palate-contacting portion of an upper denture plate, said part-tray comprising means constituting a socket, and means carried by the mount designed to fit within said socket thereby removably to unite the mount and support so as to provide a trial plate.

6. In combination, a tooth mount operative removably to hold a plurality of artificial teeth in assembled relation in semblance to teeth permanently mounted in a denture, said mount being a unitary mass of moulded material and comprising an elongate normally substantially rigid body portion which is channel-shaped in transverse section so as to provide a groove in its labial face, said grooved face being convexly arched in simulation of the human gum ridge and being of such dimensions as to permit of its introduction into the human mouth for observations therein of teeth attached to said arched part, and means within the groove operative removably to secure the teeth to the mount, said arched part being of such transverse width as to expose the gingival portions of the teeth mounted thereon for close juxtaposition to the gum ridge, the mount having a tab projecting rearwardly from the lingual side of its body portion, and a rigid support having a socket shaped to receive said tab and means for removably retaining the tab within the socket, the mount being of a material which is not distorted by the operation of the mounting teeth thereon or removing them therefrom.

7. A tooth mount operative removably to hold a plurality of artificial teeth in assembled relation in semblance to teeth permanently mounted in a denture, said mount comprising an elongate narrow, normally substantially rigid body portion which is channel-shaped in transverse section so as to provide a groove designed to receive the attaching pins of the teeth, said grooved part being arched similarly to the human gum ridge, a body of wax within the groove operative, by engagement with the attaching pins, removably to secure the teeth to said part with the gingival and incisal portions of the teeth overhanging the upper and lower edges respectively of said arched part, and a tab projecting from the lingual side of the mount, a supporting base having an aperture therein through which the end of said tab may be projected, and means engageable with the tab at the under side of said base for removably securing the mount to the base with the tooth-carrying part arched upwardly.

8. A tooth mount operative removably to hold a plurality of artificial teeth in assembled relation, said mount comprising an elongate, normally substantially rigid narrow body portion which is channel-shaped in transverse section so as to provide a groove, said grooved part being arched similarly to the human gum ridge, means within said groove operative removably to secure the teeth to said part with the gingival and incisal portions of the teeth overhanging the upper and lower edges respectively of said arched part, a tab projecting from the lingual side of the mount and a supporting device of such dimensions as to permit of its introduction into the human mouth, said supporting device having therein a socket for the reception of the tab, said socket having a resilient wall designed frictionally to engage the tab whereby the mount with its complement of teeth may be temporarily supported in a mouth of a patient with the tooth-carrying part of the mount arched in a substantially horizontal plane.

9. A tooth mount comprising an elongate normally substantially rigid body portion having a channel in its labial side for the reception of an adhesive, tooth-attaching medium, and pins projecting from said body portion and arranged to enter the gingival cavities of crown-type teeth having their upper labial and adjoining gingival portions disposed in said channel, the mount also including an attaching element projecting from the lingual side of the body portion for securing it to a support.

10. A mount for crown-type teeth, said mount having an elongate, normally substantially rigid body portion arched in simulation of the human gum ridge and having a forwardly and downwardly inclined lower wall and having an upper wall which is defined by a series of spaced downwardly and forwardly inclined pins, said channel being designed to receive a mass of material operative removably to attach teeth to the mount with the upper lingual and adjoining gingival portions of anterior teeth disposed within the channel and in adhesive engagement with said mass of material, said mount having a rearwardly directed attaching element at its lingual side.

11. A tooth mount of permanent character, useful as a shipping or display card, and operative removably to hold a plurality of artificial teeth in assembled relation in semblance to teeth permanently mounted in a denture, said mount comprising an elongate narrow normally substantially rigid body portion which is channel shaped in transverse section so as to provide a groove designed to receive the attaching pins of the teeth, said grooved part being arched similarly to the human gum ridge, a body of wax within the groove operative by engagement with the attaching pins to secure the teeth to said part for manual individual adjustment, removal or replacement without injury to or distortion of the mount and with the gingival and incisal portions of the teeth overhanging the upper and lower edges respectively of said arched part, and a tab projecting from the lingual side of the mount, a supporting base having an aperture through which the end of said tab may be projected, and a thin cam plate having an elongate slot relatively wide at one end and narrow at its opposite end, the narrow part of said slot being of such a width that when the tab occupies this portion of the slot the thin edge of the plate bites into the material of the tab.

SIMON MYERSON.